Aug. 5, 1958  T. B. DILWORTH ET AL  2,846,148
AIR HEATING SYSTEM

Filed Aug. 19, 1955  3 Sheets-Sheet 1

INVENTOR.
Thomas B. Dilworth
Max Ephraim Jr.
BY John J. Taleggio

R. R. Candor
THEIR ATTORNEY

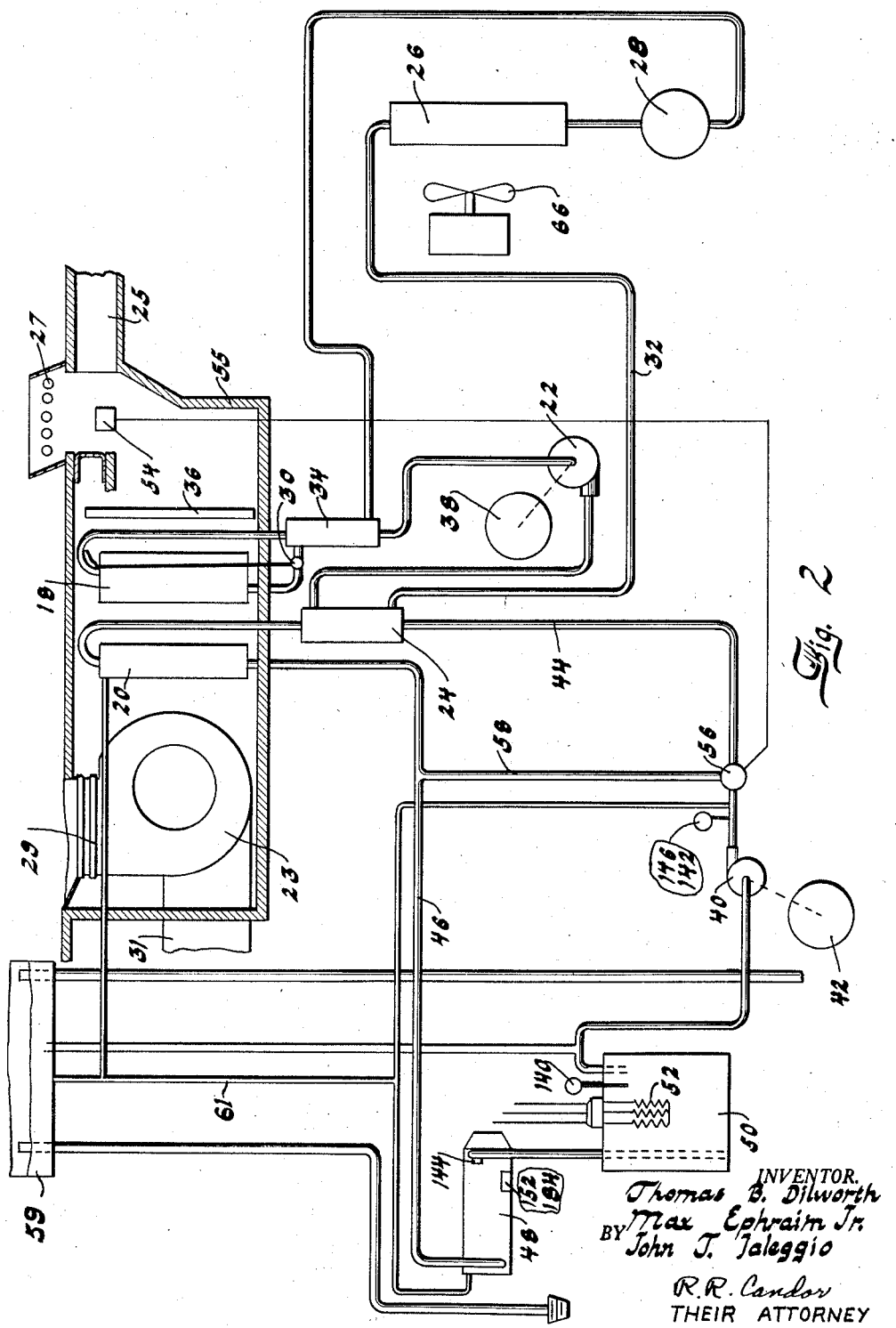

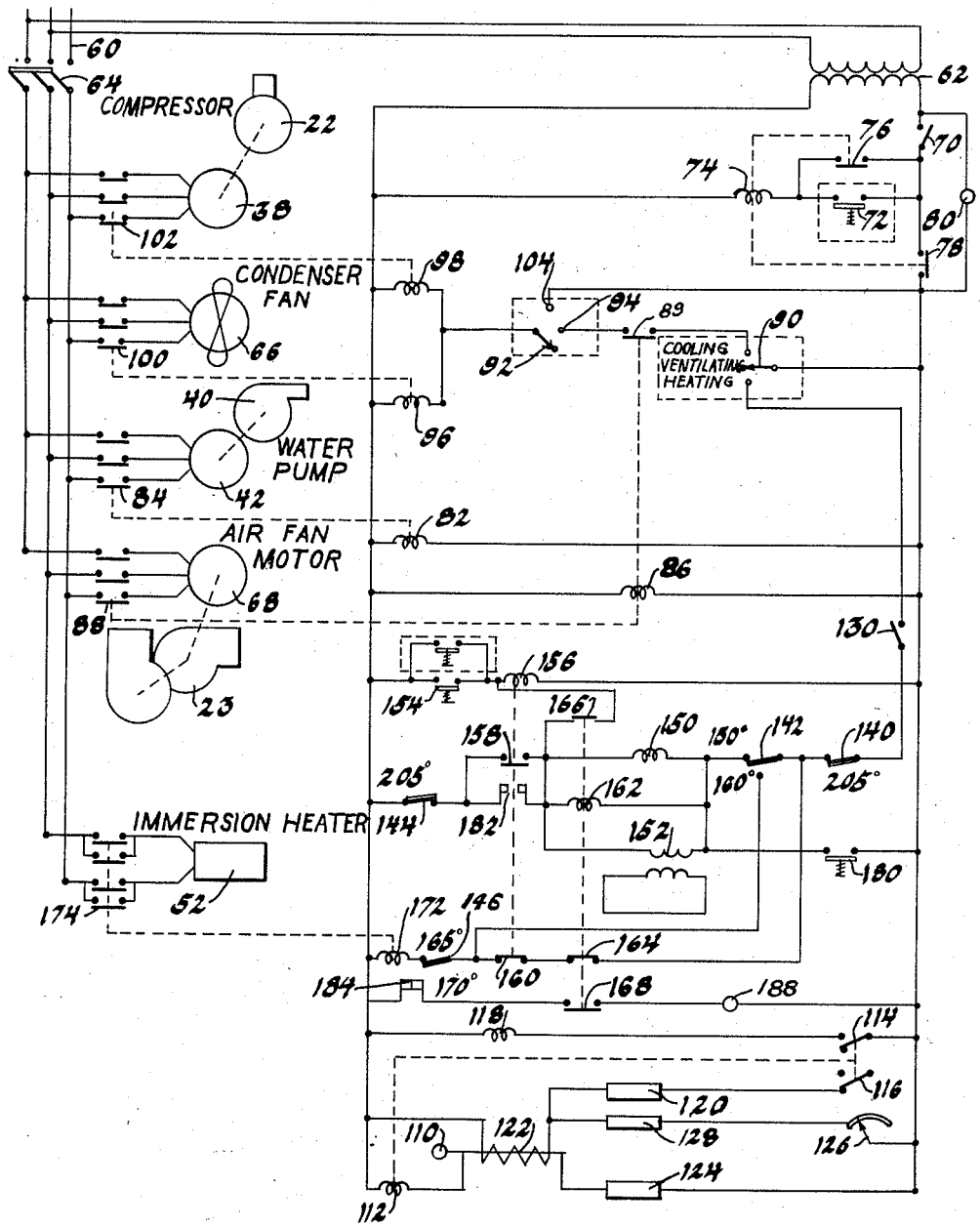

2,846,148
Patented Aug. 5, 1958

2,846,148

AIR HEATING SYSTEM

Thomas B. Dilworth, Hinsdale, and Max Ephraim, Jr., Chicago, Ill., and John T. Ialeggio, Gary, Ind., assignors to General Motors Corporation, Detroit, Mich., a corporation of Delaware Application August 19, 1955, Serial No. 529,408

3 Claims. (Cl. 237—8)

This invention relates to refrigerating apparatus and more particularly to a railway air conditioning system.

It is an object of this invention to provide a lightweight and compact system which is efficient in operation and capable of closely regulating the temperature in the passenger compartment of a modern train.

Another object of this invention is to provide an air conditioning system which may also be used to dehumidify the air on humid days when little or no cooling is required.

More particularly it is an object of this invention to circulate water between a pre-condenser unit and an air contacting coil located in the path of the air leaving the evaporator so as to regulate the effective amount of cooling.

Another object of this invention is to provide a refrigerating system in which the same pump and air contacting coil which are used for circulating a heating medium during the heating season are used in circulating a liquid between air contacting coil and a pre-condenser in the refrigerating system so as to partially nullify the cooling capacity of the refrigerating system and thereby control the extent to which the air is cooled.

Further objects and advantages of the present invention will be apparent from the following description, reference being had to the accompanying drawings, wherein a preferred form of the present invention is clearly shown.

In the drawings:

Figure 2 is a view diagrammatically showing the refrigeration and heating systems; and Figure 3 is a schematic wiring diagram showing the electric controls used with the apparatus shown in Figures 1 and 2.

Figure 1:
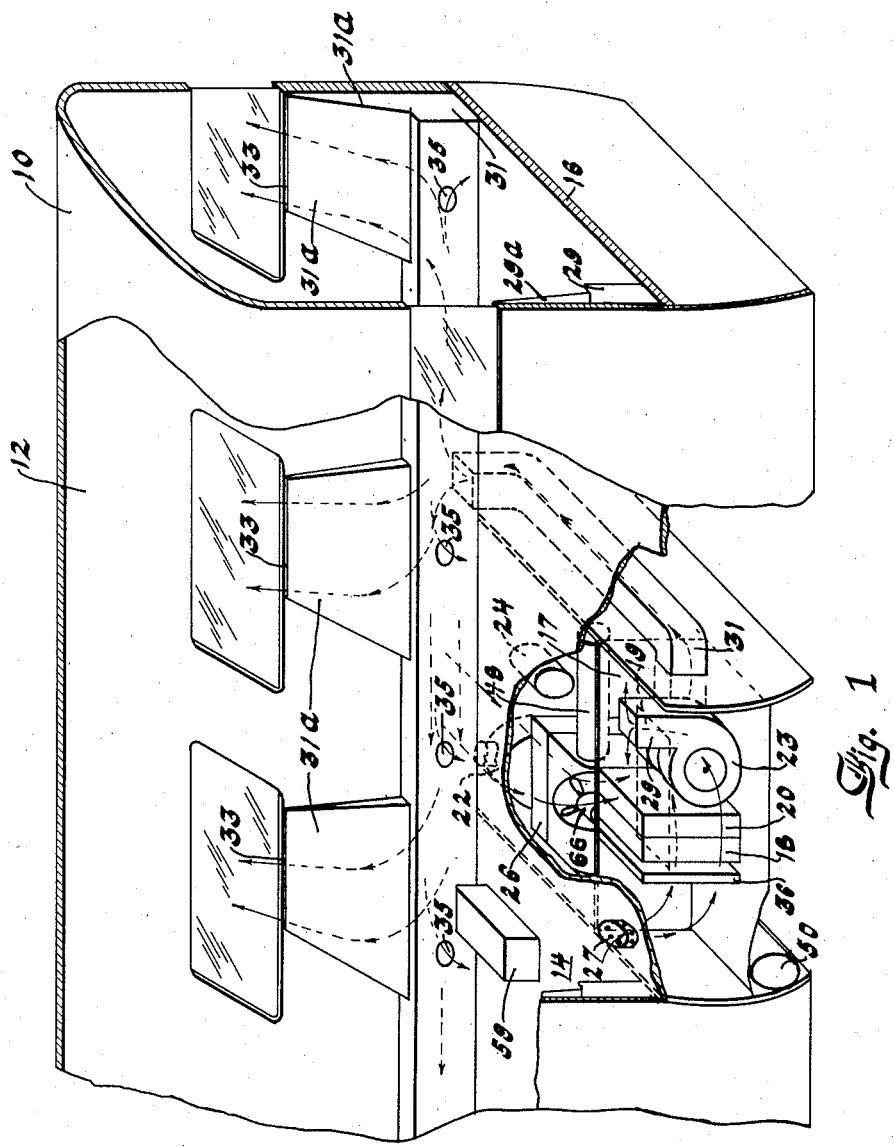
Figure 1 is a perspective view with parts broken away showing somewhat diagrammatically the arrangement of the air conditioning equipment on the car.

Referring now to Fig. 1 of the drawings wherein a preferred embodiment of the invention has been shown, reference numeral 10 designates a railway car having a passenger compartment 12 and a transversely extending machinery and air conditioning compartment 14 located beneath the floor 16 of the passenger compartment. The compartment 14 houses the refrigerating and heating equipment and includes partition means 17 for isolating the air contacting coils 18 and 20 from the rest of the equipment, in accordance with usual practice.

As best shown in Fig. 2 of the drawings, the air conditioning equipment comprises a refrigeration system including a compressor 22, a pre-condenser 24, an air cooled main condenser 26, a receiver 28, thermostatic expansion valve 30, and evaporator coil 18 all connected in series refrigerant flow relationship by means of the usual refrigerant lines 32. A heat interchanger 34 is provided as shown to transfer heat from the liquid refrigerant entering the evaporator to the vaporized refrigerant leaving the evaporator. The evaporator is arranged in the path of the air to be conditioned at a point between the air filter 36 and the heat or reheat coil 20. A condenser air circulating fan 66 brings in outside air through the one side wall of the machinery compartment and discharges the air down through a bottom opening 19 at the center of the car.

A dual blower or fan assembly 23 pulls in a mixture of fresh air from the fresh air inlet 25 and return air from one or more return air inlets 27 and discharges the conditioned air into a pair of air distributing ducts 29 and 31 which distribute the air along the opposite sides of the passenger compartment, as shown. The ducts 29 and 31 discharge the conditioned air into the passenger compartment through a series of vertically disposed branch ducts 29a and 31a having outlets 33 arranged in line with the bottom edges of the windows and through various other suitable outlets such as the outlets 35 arranged at spaced points adjacent the floor. The outlets 35 are preferably closed when cooling is required and are opened only during the heating season when they serve to discharge heated air adjacent the floor of the car.

For purposes of illustration, the compressor has been shown driven by an electric motor 38 whereas an internal combustion engine could be used to drive the compressor insofar as certain aspects of the invention are concerned. The compressor 22 operates continuously at a constant speed during the cooling season and the effective output of the refrigeration system is controlled by returning some of the heat removed from the air by the evaporator to the air leaving the evaporator whenever the capacity of the refrigeration system exceeds the cooling requirements.

All of the heat removed from the air by the evaporator 18 is absorbed by the refrigerant as it vaporizes in the evaporator and is subsequently discharged by the compressor 22 into the pre-condenser 24 where all or any desired fraction thereof is available for return to the air stream by the air heating fluid such as water, ethylene glycol or the like which may be circulated between the pre-condenser 24 and the air heating coil 20 by means of a water pump 40. The term water as used herein is intended to include any type of heat transfer liquid suitable for use in the air heating system.

The pump 40 is driven by an electric motor 42 and operates continuously both during the heating season and the cooling season. Whenever maximum heating is required all of the liquid circulated by the pump flows into the feed line 44 which first directs the liquid through the pre-condenser 24 and then the air contacting coil 20. In returning to the pump 40, the liquid flows through the return line 46 which directs the liquid in series through a conventional oil fired water heater 48 and a water heater tank 50 in which an electric immersion heater 52 is provided for a purpose to be explained more fully hereinafter. An expansion and filler tank 59 is provided as shown, and as long as this is kept filled the water circulating system will be full at all times. Vent lines 61 are provided for preventing air pockets in the water circuit. During the cooling season the heaters 48 and 52 are inoperative and the only source of heat for reheating the air is derived from the pre-condenser 24. The amount of reheating which takes place is controlled by a thermostat 54 which is located in the return air duct 55 so as to respond to the temperature in the passenger compartment of the car and this thermostat regulates a by-pass valve 56 which directs the liquid handled by the pump 40 through a by-pass line 58 so that the effective cooling output of the refrigeration system may be varied. In this manner it is possible to closely regulate the temperature of the air delivered to the passenger compartment so as to balance the effective capacity of the refrigeration system with the cooling load in the car. For purposes of illustration, we have shown a system in which the valve 56 moves directly from fully open to fully closed position, whereas one could use a modulating type of valve.

During the heating season the refrigeration equipment is turned off so that at no time will both the refrigerating equipment and the auxiliary heating equipment be called upon to operate. For purposes of illustration, we have shown a control arrangement wherein manual means are provided for selectively turning on either the heating equipment or the cooling equipment, whereas it is within the scope of this invention to provide automatic means for automatically initiating operation of either the heating equipment or cooling equipment, depending upon the air conditioning requirements.

In Fig. 3 of the drawings we have shown somewhat schematically the electric controls used for controlling the operation of the refrigerating and heating equipment. In order to simplify the disclosure, such conventional elements as fuses and overload protection relays have been omitted whereas these would obviously be used in accordance with conventional practice. The power for operating the electric equipment and the electric controls is supplied by means of power lines 60 which are connected to an auxiliary diesel operated generator, not shown, provided in the auxiliary equipment compartment of the train. The power supplied to the line 60 is preferably 440 volt, 3 phase, 60 cycle and this being the case, a transformer 62 is provided for supplying current at a lower voltage to the various control relays.

A master control switch 64 is provided in the main power lines which lead to the compressor motor 38, the condenser fan motor 66, the water pump motor 42, the evaporator fan motor 68 and the immersion heater 52, as shown. This master control switch 64 must be closed before any of the air conditioning equipment can be operated. A second master control switch 70 is provided in the low voltage relay control circuit as shown and this switch must also be closed before any of the air conditioning equipment can operate. Upon closing of the switch 70, the air conditioning control circuits and equipment are rendered operative by momentarily closing the control relay reset switch 72 which energizes the control relay solenoid 74 which, when energized, closes the control relay holding switch 76 and the pilot control switch 78. Upon closing of the master switch 70 and the pilot control switch 78 the signal light 80 will be shunted out so as to indicate that the switches 70 and 78 are closed. It will be observed that the circuit is so arranged that upon closing of the switches 70 and 78 a circuit is closed to the pump controlling relay 82 which closes the pump control switch 84 so as to initiate operation of the water circulating pump 40. The air fan relay 86 is also energized with the result that the main air fan control switch 88 is closed so as to initiate operation of the blower motor 68, which causes circulation of air over the evaporator 18 and the heat exchanger 20. The relay 86 also closes the switch 89 in the cooling equipment control portion of the circuit as shown. Before either the compressor 22 or the condenser fan 66 will go into operation it is also necessary to operate the heating-cooling control switch 90.

Whenever cooling is desired, the manually operated switch 90 would be moved to its upper or cooling position and the switch 92 moved into engagement with the contact 94 so as to cause operation of the relays 96 and 98 which close the condenser fan switch 100 and the compressor switch 102, respectively. It will be noted that the switch 92 can be used to turn off the condenser fan motor 66 and the compressor 22 even though the switch 90 is set to call for cooling. It will also be noted that the switch 92 may be moved into engagement with a contact 104 which causes energization of the condenser fan motor and the compressor motor for test purposes even though the selector switch 90 is in the "off" position or the heating position. So long as the selector switch 90 is set in the cooling position and the switch 92 is set to engage the contact 94, the refrigeration system will operate continuously to produce cooling.

Whenever there is excess cooling, the mercury column type of thermostat 110, which is preferably located either in the passenger compartment of the car or in the return air duct, as shown, will cause the circuit to be opened through a relay coil 112 so as to cause opening of switch 114 and closing of switch 116. Closing of the switch 114 energizes a solenoid 118 which controls the by-pass valve 56 so as to control the reheating produced by the heat exchanger 20. Closing of the switch 116 serves to connect a resistance element 120 in series with the heater coil 122 which surrounds the mercury column of the mercury control switch 110 so as to reduce the operating differential of the thermostat 110. This results in the by-pass valve 56 opening and closing frequently enough so that the temperature of the outer surface of the coil 20 does not have a chance to fluctuate to any great extent. It will be noted that a resistance element 124 is connected in the circuit to the thermostat, as shown, so as to reduce the flow of current through the mercury thermostat 110. The responsiveness of the thermostat 110 can be controlled by a rheostat 126 which is arranged in series with a resistance element 128 and the heating coil 122, as shown.

By virtue of the above described arrangement, it is obvious that the refrigerating system operates continuously whenever the controls are set to produce cooling and the effective amount of cooling is controlled by using the heater coil 20 for returning to the air some of the heat removed from the air by the evaporator 18. It is further obvious that moisture will be removed from the air at all times when the refrigerating equipment is in operation even though little if any cooling is required. Thus, when the humidity of the air is high but no cooling is required, such as on rainy days, the air conditioning equipment will serve to dehumidify the air without materially lowering the temperature of the air in the passenger compartment of the car.

Assuming, now, that the outside air temperature is such that no cooling is required but ventilation is desired, the selector switch 90 may be turned to the ventilation position whereby the condenser fan motor 66 and the compressor 22 will be deenergized but the blower motor 68 will be energized so as to continue operation of the main air circulating fans for ventilating purposes.

By moving the selector switch 90 into the heating position, the heating equipment will come into operation provided the manually operated heater cut-off switch 130 is in its closed position. Closing of the heating circuit through the selector switch 90 and the heater cut-off switch 130 places the heating equipment under control of the thermostats 140, 142, 144 and 146 which are arranged in the circuit as shown. The thermostats 140 and 144 are normally closed whenever the water temperature in the heating circuit is below 205°, but if for any reason the water temperature should exceed 205°, these thermostats would open so as to prevent operation of either the fuel fired heater 48 or the immersion heating unit 52. When the heating equipment is first placed into operation, the water temperature will obviously be below 150° whereby thermostatic switch 142 which automatically closes at temperatures below 150° will close the circuit to the fuel valve 150 for the fuel fired heater 48. The thermostat 142 also closes the circuit to the igniter 152 for the fuel fired heater 48. Before any of the heater equipment can be placed into operation, it is necessary to close one or the other of the heater starting switches 154 so as to energize the relay solenoid 156 which then closes the holding switch 158 and opens the switch 160 which prevents operation of the immersion heater 52 whenever the fuel fired heater 48 is in operation. When the thermostat 142 is in its upper position, as shown in Fig. 3 of the drawings, the relay coil 162 will be energized so as to open the switches 164 and 166 and close the switch 168.

In the heating cycle either the fuel fired heater 48 or the electric immersion heater 50 furnishes the heat, but at no time can both operate simultaneously. In operation the fuel fired heater 48 goes on first and will bring the water temperature up to 160° at which time the thermostat 142 will open the circuit to the solenoids 150 and 162 and will close a circuit to the line 170 which closes a circuit to the thermostat 146 and the immersion heater control solenoid 172. Energization of the solenoid 172 causes the immersion heater switch 174 to close and thereby cause the immersion heater 52 to operate. The immersion heater 52 will attempt to raise the water temperature to 170° at which time the thermostat 146 would open the circuit to the solenoid 172 so as to cause deenergization of the immersion heater 52. If the outside ambient temperature is sufficiently cold that this rise cannot occur, the electric heater will cut off and the fuel fired heater will again operate. There is a 10° overlap in the controls of the two heating systems to prevent cycling. The electric heater takes over from the oil fired heater at 160° F. water temperature but will cut out at 150° when the fuel fired heater again takes over. Thus, the thermostat 142 is closed at all temperatures below 150° and remains closed until the water temperature reaches 160° at which time it moves from its upper position, as shown in Fig. 3, to its lower position so as to turn on its electric heaters which are then under control of the thermostat 142 which is closed at all temperatures below 165° and remains closed until the water temperature reaches 170°, at which time it opens.

It will be noted that a test switch 180 is provided in the circuit to the fuel fired heater for closing the circuit thereto for test purposes even though the thermostats may not call for any heating. The usual stack thermostats 182 and 184 are provided in the circuit as shown and serve their usual well-known functions to prevent supplying fuel to the fuel fired heater in the event the igniter 152 does not work or the stack temperature becomes excessive. The switch 168 serves to close the circuit to the motor 188 for the fuel fired water heater 48. The solnoid 156 is of the delayed action type which does not open the switches 158 and 160 until the solenoid has been deenergized for a period of 45 seconds.

While the form of embodiment of the invention as herein disclosed constitutes a preferred form, it is to be understood that other forms might be adopted, as may come within the scope of the claims which follow.

What is claimed is as follows:

1. In a heating system for use in air conditioning a compartment, an air heating coil; means for circulating air for said compartment in thermal exchange relationship with said air heating coil; a fuel fired water heater; an electric water heater; a pump; conduit means connecting said air heating coil, said fuel fired heater, said electric water heater, and said pump in series flow relationship; first control means responsive to the temperature of the water for initiating operation of said fuel fired heater so as to elevate the temperature of said water to a predetermined value; second control means responsive to the temperature of the water for connecting said electric water heater to a source of electric power at water temperatures in the temperature zone above said predetermined value; means cooperatively associated with said first and second control means to prevent simultaneous energization of said fuel fired water heater and said electric heater whereby said electric water heater is disconnected from said source of electric power at a water temperature below said predetermined value and the operation of said fuel fired water heater is reinitiated; means for operating said pump continuously; and means responsive to the temperature of the air in said compartment for varying the amount of heat delivered to said air heating coil.

2. The structure as set forth in claim 1 wherein said last named means includes means for by-passing said air heating coil with a portion of the water circulated by said pump whereby only a portion of the water circulated by said pump passes through said air heating coil.

3. The structure as set forth in claim 1 wherein said last named means comprises means for varying the amount of water circulated through said air heating coil.

References Cited in the file of this patent

UNITED STATES PATENTS

| | | |
|---|---|---|
| 2,179,873 | Anderson | Nov. 14, 1939 |
| 2,241,060 | Gibson | May 6, 1941 |
| 2,241,070 | McLenegan | May 6, 1941 |
| 2,291,029 | Everetts | July 28, 1942 |
| 2,341,781 | Hornaday | Feb. 15, 1944 |
| 2,388,210 | Hanson et al. | Oct. 30, 1945 |
| 2,700,505 | Jackson | Jan. 25, 1955 |
| 2,715,515 | Stair | Aug. 16, 1955 |
| 2,749,048 | Edge | June 5, 1956 |